US009302178B2

(12) United States Patent
Miyashita et al.

(10) Patent No.: US 9,302,178 B2
(45) Date of Patent: Apr. 5, 2016

(54) GAMING SCHEME USING GENERAL MOOD INFORMATION

(71) Applicant: Empire Technology Development LLC, Wilmington, DE (US)

(72) Inventors: Takahiro Miyashita, Kizugawa (JP); Satoru Satake, Kizugawa (JP); Masahiro Shiomi, Kizugawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 81 days.

(21) Appl. No.: 13/878,512

(22) PCT Filed: Dec. 13, 2012

(86) PCT No.: PCT/US2012/069486
§ 371 (c)(1),
(2) Date: Apr. 9, 2013

(87) PCT Pub. No.: WO2014/092711
PCT Pub. Date: Jun. 19, 2014

(65) Prior Publication Data
US 2014/0169690 A1    Jun. 19, 2014

(51) Int. Cl.
*A63F 13/40*        (2014.01)
*A63F 13/30*        (2014.01)

(52) U.S. Cl.
CPC .................. *A63F 13/10* (2013.01); *A63F 13/12* (2013.01); *A63F 2300/1093* (2013.01); *A63F 2300/535* (2013.01); *A63F 2300/5546* (2013.01); *A63F 2300/6045* (2013.01)

(58) Field of Classification Search
None
See application file for complete search history.

(56) References Cited

U.S. PATENT DOCUMENTS

| 5,774,591 A | 6/1998 | Black |
| 6,405,213 B1 | 6/2002 | Layson et al. |
| 8,069,131 B1 * | 11/2011 | Luechtefeld et al. ........... 706/47 |
| 2005/0285943 A1 | 12/2005 | Cutler |
| 2009/0254971 A1 * | 10/2009 | Herz et al. ........................ 726/1 |
| 2009/0270170 A1 | 10/2009 | Patton |

(Continued)

FOREIGN PATENT DOCUMENTS

| JP | 2006212043 A | 8/2006 |
| JP | 2011237970 A | 11/2011 |

OTHER PUBLICATIONS

Ortag et al. "Location-Based Emotions Relevant for Pedestrian Navigation" was presented at "Proceedings of the 25th International Cartographic Conference" held in Paris, France, on Jul. 3-8, 2011.*
International Search Report from International Application No. PCT/US12/69486 mailed Feb. 8, 2013.
"Development of real-time smile measurement technology," Acessed at URL: http://www.omron.co.jp/press/2007/09/c0905_a.html, Sep. 5, 2007, p. 1.

(Continued)

*Primary Examiner* — Vu Le
*Assistant Examiner* — Alexander J Lesnick
(74) *Attorney, Agent, or Firm* — Brundidge & Stanger, P.C.

(57) ABSTRACT

Technologies are generally described for a general mood adding scheme in a cloud-based game system. In some examples, a method performed under control of a computing device may include receiving from a raw database at least one set of facial expression data, each of the at least one set of facial expression data being accompanied by time information and location information, clustering a geographic area to form at least one cluster based at least in part on the at least one set of facial expression data, and storing the at least one cluster in a map database corresponding to the area.

18 Claims, 8 Drawing Sheets

(56) References Cited

U.S. PATENT DOCUMENTS

| | | | |
|---|---|---|---|
| 2010/0332210 A1 | 12/2010 | Birdwell et al. | |
| 2011/0007142 A1 | 1/2011 | Perez et al. | |
| 2012/0136865 A1* | 5/2012 | Blom et al. | 707/739 |
| 2012/0150430 A1* | 6/2012 | French et al. | 701/425 |
| 2012/0257797 A1* | 10/2012 | Leyvand et al. | 382/118 |
| 2014/0136451 A1* | 5/2014 | Marti et al. | 706/12 |

OTHER PUBLICATIONS

"Track and understand faces like never before with faceAPI from Seeing Machines—now available for license," Accessed From URL: http://web.archive.org/web/20130201064412/http://www.seeingmachines.com/product/faceapi/ , Accessed on Dec. 8, 2014, pp. 1-2.

* cited by examiner

GAMING SCHEME USING GENERAL MOOD INFORMATION

CROSS-REFERENCE TO RELATED APPLICATION

This Application is the National Stage filing under 35 U.S.C. §371 of PCT Application Ser. No. PCT/US12/69486, filed on Dec. 13, 2012. The disclosure of the PCT Application is hereby incorporated herein by reference in its entirety.

BACKGROUND

GPS technologies have experienced phenomenal growth in the last few years. Game providers have adapted these technologies for position-based games. For example, games involving physical searches, such as orienteering game, treasure hunts, tag etc., may utilize a GPS system to determine the location of one or more players.

SUMMARY

In an example, a method performed under control of a computing device may include receiving, from a raw database, at least one set of facial expression data, each of the at least one set of facial expression data being accompanied by time information and location information; clustering a geographic area to form at least one cluster based at least in part on the at least one set of facial expression data; and storing the at least one cluster in a map database corresponding to the geographic area.

In an example, a method performed under control of a computing device may include receiving at least one image captured by at least one camera located in a geographic area, obtaining at least one set of facial expression data from the at least one captured image, each of the at least one set of facial expression data being accompanied by time information and location information; clustering the geographic area to form at least one cluster based at least in part on the at least one set of facial expression data; and storing the at least one cluster in a map database corresponding to the geographic area.

In an example, a computing device may include a receiving unit configured to receive from a raw database at least one set of facial expression data, each of the at least one set of facial expression data being accompanied by time information and location information; a clustering unit configured to perform a spatiotemporal clustering of a geographic area to form at least one cluster based at least in part on the at least one set of facial expression data; and a storing unit configured to store the at least one cluster in a map database corresponding to the geographic area.

In an example, a computer-readable storage medium having stored thereon computer-executable instructions that, in response to execution, cause a computing device to perform operations that may include receiving from a raw database at least one set of facial expression data, each of the at least one set of facial expression data being accompanied by time information and location information; clustering a geographic area to form at least one cluster based at least in part on the at least one set of facial expression data; and storing the at least one cluster in a map database corresponding to the geographic area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
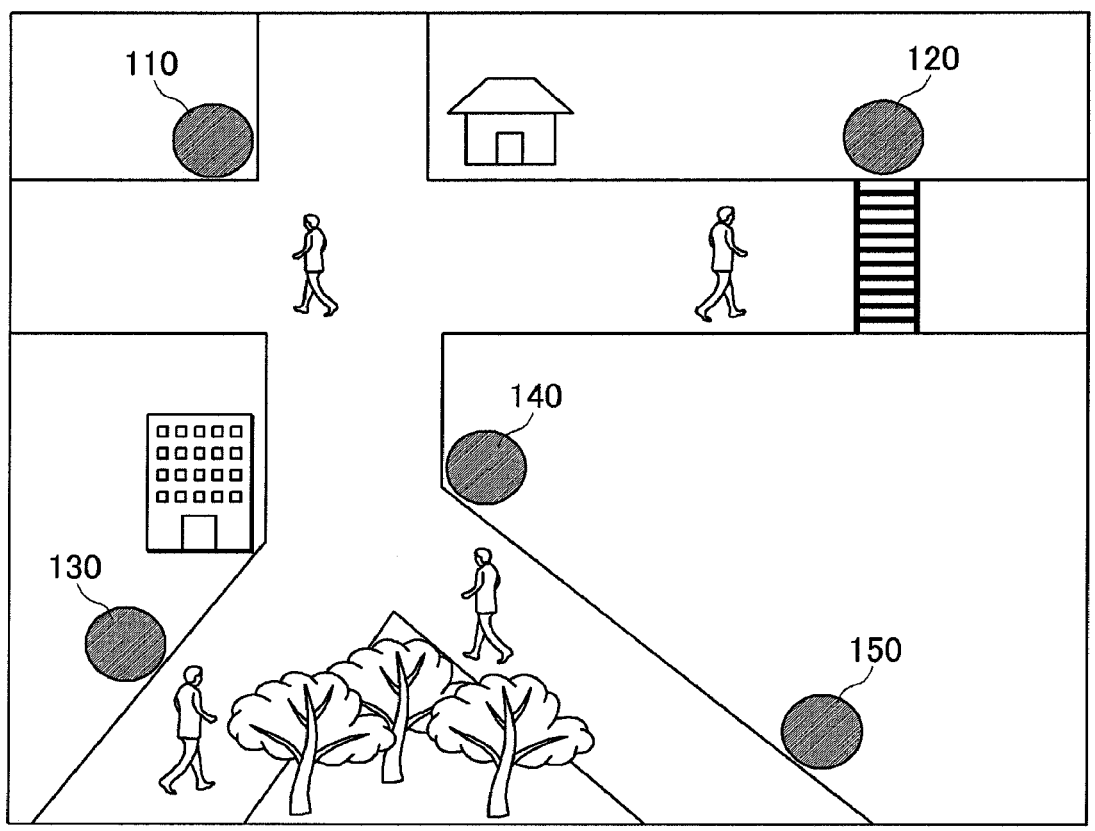
FIG. 1 schematically shows an illustrative example of an environment in which general mood information is obtained at multiple points, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to gaming scheme using general mood information.

Technologies are generally described for a game system in which a computing device may acquire images of people in a particular geographic region using multiple cameras installed in the geographic region. Non-limiting examples of such a particular geographic region may include a city, county, town, hamlet, neighborhood, etc. The computing device may recognize facial expressions of people in the particular geographic region using facial recognition technologies, and record the facial expressions and time and place information relating to the facial expressions in a raw database. Further, the computing device may spatiotemporally cluster a geographic area of the geographic region using the facial expressions and the time and place information and form one or more clusters with respective general mood information. The general mood information may reveal or indicate an emotion relating to or determined based on the facial expressions of the people at a particular time in a particular place. By way of example, but not limitation, the general mood information may include delight, anger, sorrow, joy, shock, fear, abomination and indifference. The general mood information may be attached to a digital map of the geographic region stored in a map database, and game providers may utilize the digital map of the geographic region for their games, such as actual position-based games.

By way of example, but not limitation, images of people passing by a street A in the geographic region at 1 p.m. may be acquired with cameras installed around the street A, and facial expressions may be recognized using facial recognition technologies. If majority of recognized facial expressions may be categorized as "delight," the street A at 1 p.m. may be clustered as "delight," and general mood information of "delight" at 1 p.m. may be attached to the street A in the digital map.

Further, external factors, such as population density, weather conditions, and information about events being held in the vicinity of a particular place at a particular time (e.g., local current events), together with the recognized facial expressions of the people, may be acquired and stored in the raw database, and general mood information including such external factors may be attached to the digital map. By obtaining a correlation between the external factors and the one or more clusters, it is possible to attach information as to how the general mood information changes according to the external factors.

By way of example, but not limitation, the map database may be a cloud datacenter, and cloud computing technologies may be employed for database management, data update and information distribution. Therefore, it may be possible to obtain and periodically update the digital map by various game providers and the game providers may be able to use the digital map for their games.

In some embodiments, a game player, who is playing an actual position-based game utilizing the digital map with the general mood information stored in the map database, may refer to the general mood information at a particular time in a particular place with indexes of time, place (and event information, if any) from the map database, and use the general mood information while playing of the game. By way of example, but not limitation, for a treasure-hunting game, the game player may want to ask passersby for a hint in order to find a treasure. In such a case, the game player may refer to the general mood information at the present time in the place where the game player is located. If the general mood information indicates "delight," the game player may assume that it may be easy to get the hint from the passersby; but if the general mood information indicates "anger," the game player may assume that it may not be easy to get the hint from the passersby. In this way, general mood information may be used for games in various ways.

FIG. 1 schematically shows an illustrative example of an environment in which general mood information is obtained at multiple points, arranged in accordance with at least some embodiments described herein.

As depicted in FIG. 1, general mood information may be obtained at multiple points 110 to 150, and one or more cameras for capturing images of people may be installed at each of respective multiple points 110 to 150. Each camera may capture images of people who pass by the camera. By way of example, but not limitation, images of people crossing at a crosswalk may be captured with a camera installed at point 120.

In some embodiments, each of the cameras may be connected to a computing device, which may perform facial recognition processing of the captured images and further obtain facial expressions from the captured images. The computing device may include a personal computer, which may be installed close to each camera. In such cases, the facial expressions obtained by any of the computing device may be used to determine general mood information around respective points 110 to 150. In some embodiments, a sensor for measuring external factors (for example, but not as a limitation, a temperature, humidity, population density, etc.) may be installed at each of points 110 to 150 to measure the external factors, based on which, along with the facial expressions, the general mood information may be determined.

Figure 2:
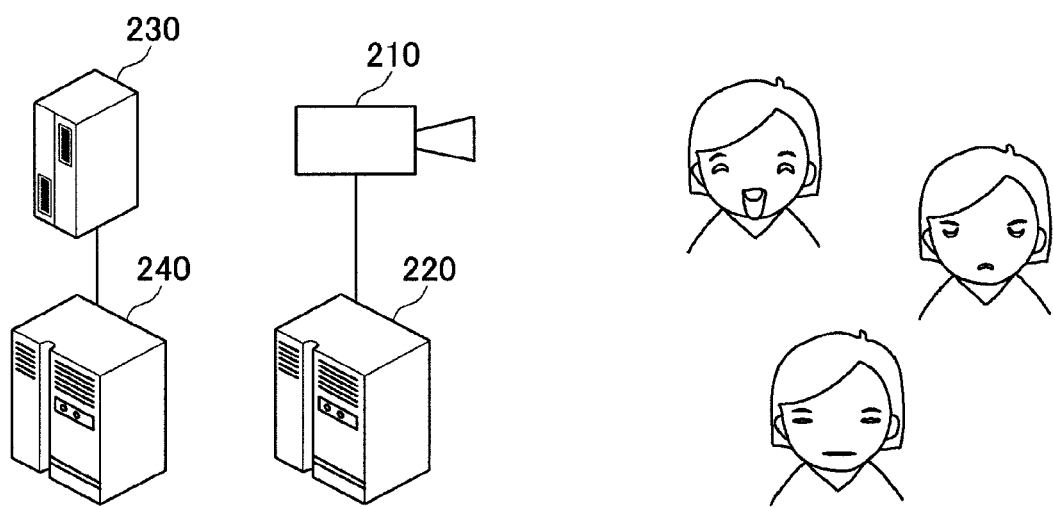
FIG. 2 schematically shows an illustrative example of a gaming scheme system configuration installed at multiple points, arranged in accordance with at least some embodiments described herein.

FIG. 2 schematically shows an illustrative example of a gaming scheme system configuration installed at multiple points, arranged in accordance with at least some embodiments described herein.

As depicted in FIG. 2, a gaming scheme system, which may be installed at each of multiple points 110 to 150, may include at least one camera 210, a facial expression recognition unit 220, a sensor 230 for measuring external factors, and an external factor input/output unit 240.

Camera 220, which may be installed at a particular one of points 110-150, may be configured to acquire images including facial expressions of people passing by, and transmit the acquired images to facial expression recognition unit 220.

Facial expression recognition unit 220 may be configured to recognize three-dimensional positions and facial expressions of the people from the images received from camera 210 and record the facial expressions together with an image acquisition time and an acquisition location in a raw database, which will be described more in detail below. As depicted in FIG. 2, people whose images are captured by camera 210 may make various facial expressions, such as smiles, frowns, or even a lack of expression. A technology for recognizing such various facial expressions may be employed from various conventional facial recognition technologies, and persons skilled in the art would appreciate that it is not limited to a particular facial recognition technology. By way of example, but not limitation, such facial expressions may be recognized based on the positions and forms of eyebrows, eyes and mouth by using a commercial software, such as faceAPI (http://www.seeingmachines.com/product/faceapi/). The recognized facial expressions may be categorized into various general moods by using, for example, SVM (Support Vector Machine). Further, OKAO® Vision of Omron Co. (http://www.omron.co.jp/press/2007/09/c0905_a.html) may be employed to determine a degree of smile of each people.

Sensor 230, which may be installed at a particular one of points 110-150, may be configured to measure external factors of a particular geographic region. In some embodiments, the external factors may include population density, weather conditions, and information about events being held in the vicinity of a particular place at a particular time. By way of example, but not limitation, with regard to population density as one of the external factors, sensor 230 may be a headcount device using infrared light. With regard to weather conditions as one of the external factors, sensor 230 may be a weather sensor for measuring illuminance, temperature, humidity, and atmospheric pressure. Further, with regard to local event information as one of the external factors, sensor 230 may be a keyboard or a mouse that enables people to input event information.

External factor input/output unit 240 may be configured to receive external factors from sensor 220 and record, in the raw database, the external factors together with time information and location information corresponding thereto.

Figure 3:
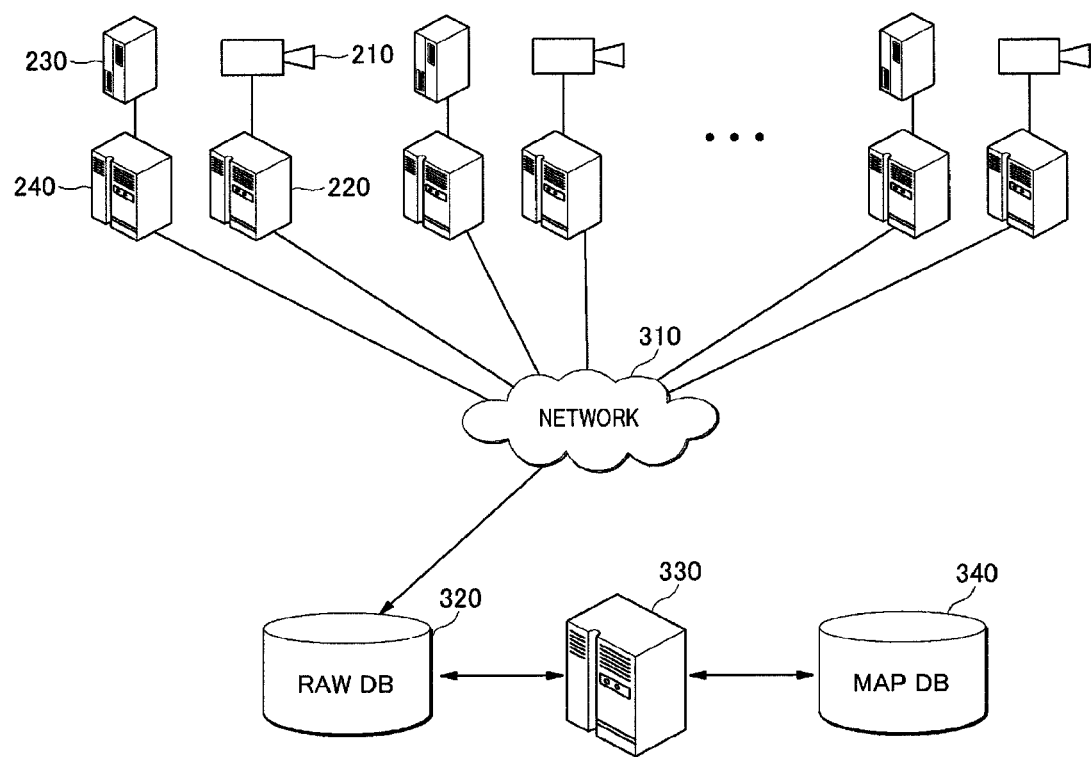
FIG. 3 schematically shows an illustrative example of a system environment for clustering a geographic area with general mood information, arranged in accordance with at least some embodiments described herein.

FIG. 3 schematically shows an illustrative example of a system environment for clustering a geographic area with general mood information, arranged in accordance with at least some embodiments described herein.

As depicted in FIG. 3, a multiple number of gaming scheme systems, may each include separate embodiments of camera 210, facial expression recognition unit 220, sensor 230 and external factor input/output unit 240, may be connected, via a network 310, to a raw database 320. As described above, facial expression recognition unit 220 may recognize three-dimensional positions and facial expressions of the people from the images received from camera 210, and record the facial expressions together with an image acquisition time and an acquisition location in raw database 320 via network 310. In some embodiments, images of facial expressions may be stored in raw database 320 whenever an image is acquired from camera 210. In some other embodiments, images of facial expressions may be stored in raw database 320 periodically.

FIG. 3 illustrates camera 210 and facial expression recognition unit 220 provided as one set; and, after recognizing facial expressions, each facial expression recognition unit 220 may provide data sets of the recognized facial expressions together with an acquisition time and an acquisition location and to raw database 320, via network 310, for storage there. However, the present disclosure is not limited thereto. In some embodiments, multiple cameras may be connected to one facial expression recognition unit 220 via network 310; and the facial expression recognition unit 220 may receive images from each of the multiple cameras, perform facial recognition processing, and store the results in raw database 320. Similarly, multiple sensors may be connected to one external factor input/output unit via network 310, and the external factor input/output unit 240 may receive external factors from each of the multiple sensors 230, and store the received external factors together with its corresponding time and place information in raw database 320.

A computing device 330 may be configured to spatiotemporally cluster the geographic region using the data sets of time, place and facial expressions stored in raw database 320 to form one or more clusters. In some embodiments, computing device 330 may perform the clustering based on data sets which may be accumulated for a predetermined period. Details of the clustering will be described below with reference to FIGS. 4A and 4B. In some embodiments, the clusters formed by computing device 330 may include general mood information that reveals an emotion relating to the facial expressions.

A map database 340 may store a digital map of an actual town, and the clusters may be attached to the digital map. In some embodiments, each of the clusters including corresponding general mood information at a particular time may be attached to a corresponding area in the digital map. Details of the attaching will be described below with reference to FIGS. 4A and 4B.

In some embodiments, map database 340 may be a cloud datacenter. Further, cloud computing technologies may be employed for database management, data update and information distribution of map database 340. In such cases, it may be possible to obtain and periodically update the digital map having the clusters attached thereto by various game providers and the game providers may be able to use the digital map for their games.

In some embodiments, a game player, who is playing an actual position-based game utilizing the digital map, may refer to the general mood information at a particular time in a particular place with indexes of time and place from map database 340 and use the general mood information for the game playing. By way of example, but not limitation, in case of a treasure-hunting game, if a game player finds a treasure in geographic region in which the generation mood is designated as "delight", double points may be given to the game player. Alternatively, in a game of tag, a game player may not be able to hide in geographic region in which the general mood is designated as "anger".

Figure 4A:
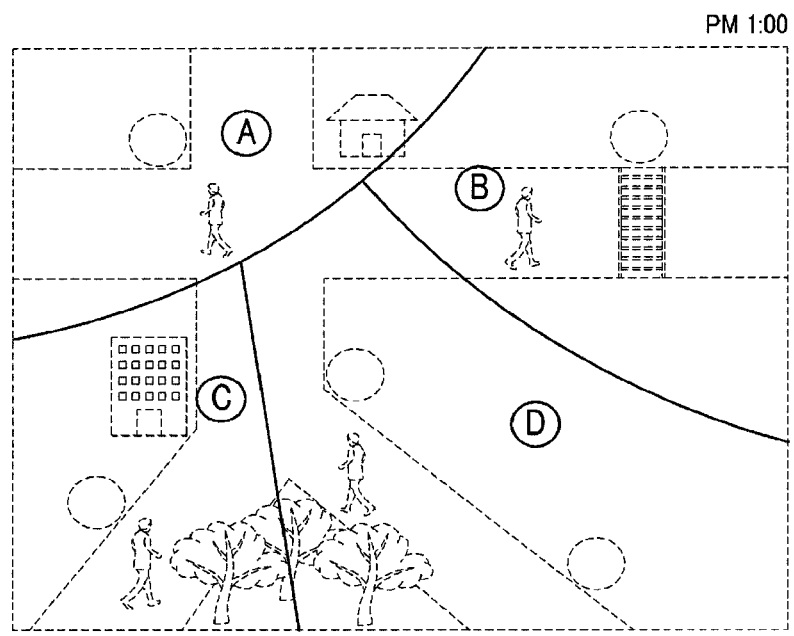
FIGS. 4A and 4B schematically show an illustrative example of clustering results based on facial expressions of people in a geographic region, arranged in accordance with at least some embodiments described herein.
Figure 4B:
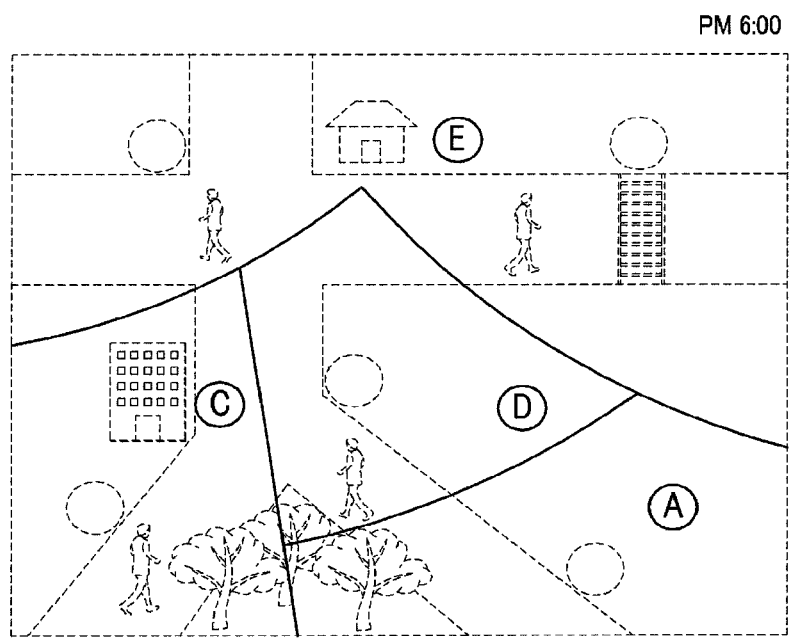

FIGS. 4A and 4B schematically show an illustrative example of clustering results based on facial expressions of people in a geographic region, arranged in accordance with at least some embodiments described herein.

As depicted in FIG. 4A, by using facial expressions stored in raw database 320, geographic region Ⓐ, geographic region Ⓑ, geographic region Ⓒ, and geographic region Ⓓ may be clustered by the respective general moods "delight," "anger," "sorrow," and a "joy." By way of example, facial expressions of people passing through geographic region Ⓐ at 1 p.m. may be acquired by a camera installed at geographic region Ⓐ and recognized, and if the majority of images of passersby have facial expressions that may be categorized as those of "delight," geographic region Ⓐ at 1 p.m. may be clustered as having the general mood "delight."

Clusters may be changed over time. As depicted in FIG. 4B, at 6 p.m., geographic region Ⓐ, which was clustered as having the general mood of "delight" at 1 p.m. may be combined with geographic region Ⓑ to become geographic region Ⓔ, which may be clustered the general mood of "neutral" or "indifference," and geographic region Ⓓ may be divided into two clusters, i.e. geographic region Ⓓ having the general mood "joy" and geographic region Ⓐ having the general mood "delight."

As described above, the presently described clustering may be performed to allocate trending moods, as expressed in captured images of facial expression data corresponding to passerby at a particular time at a particular place. By way of example, but not limitation, conventional technologies, such as an ISODATA (Iterative Self-Organizing Data Analysis Technique Algorithm) or K-means clustering, which is a method of cluster analysis that aims to partition n observations into k clusters in which each observation belongs to the cluster with the nearest mean, may be employed for the clustering.

Figure 5:
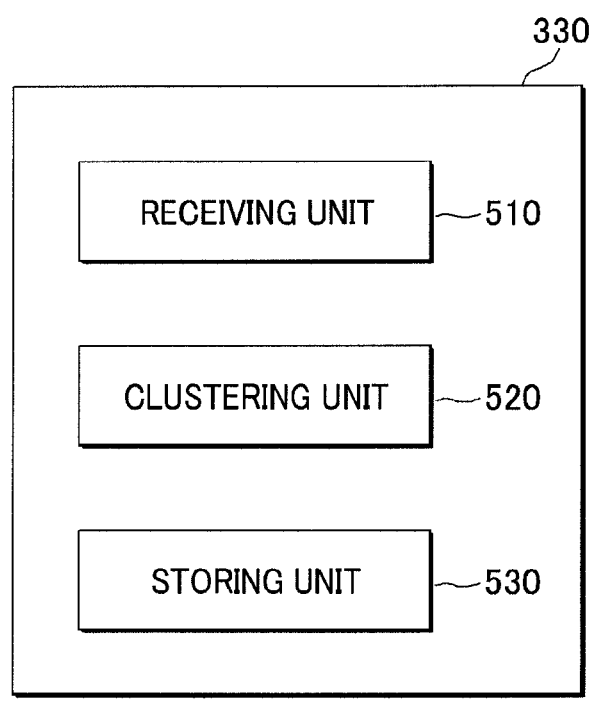
FIG. 5 shows a schematic block diagram illustrating an example architecture of a computing device for a gaming scheme using general mood information, arranged in accordance with at least some embodiments described herein.

FIG. 5 shows a schematic block diagram illustrating an example architecture of a computing device for gaming scheme using general mood information, arranged in accordance with at least some embodiments described herein.

As depicted, computing device 330 may include a receiving unit 510, a clustering unit 520 and a storing unit 530. Although illustrated as discrete components, various components may be divided into additional components, combined into fewer components, or eliminated altogether while being contemplated within the scope of the disclosed subject matter.

Receiving unit 510 may be configured to receive from raw database 320 at least one set of facial expression data. In some embodiments, each set of facial expression data may be accompanied by time information and location information. In some embodiments, each set of facial expression data may include information regarding people's facial expressions (e.g., delight, anger, sorrow, joy, shock, fear, abomination, indifference, etc.) gleaned from images acquired by camera 210 and facial expression recognition unit 220, which may be installed in a particular point in a geographical region, and stored together with an acquisition time and an acquisition location in raw database 320.

Clustering unit 520 may be configured to perform a spatiotemporal clustering of a geographic region to form at least one cluster based at least in part on general mood information corresponding to stored facial expression data. That is, clustering unit 520 may spatiotemporally cluster the set of facial expression data having time, place and facial expressions received from raw database 320, and the clustering may be performed to allocate trending facial expression data corresponding to a particular time and a particular place. Each cluster may contain general mood information. The general mood information may include delight, anger, sorrow, joy, shock, fear, abomination and neutral or indifferent states.

Storing unit 530 may be configured to store the at least one cluster in map database 340 corresponding to the particular geographic region. That is, storing unit 530 may store the clustering result of clustering unit 520 in map database 340 and attach the general mood information based on the facial expressions in the particular place at the particular time to a simple geographic map. Thus, game providers can use such a map for their games.

In some embodiments, receiving unit 510 may be further configured to receive from raw database 320 at least one external factor, and storing unit 530 may be further configured to store the at least one external factor in map database 340. In some embodiments, each external factor may relate to one of the at least one set of facial expression data. By way of example, but not limitation, the at least one external factor may include population density, weather information and event information.

Figure 6:
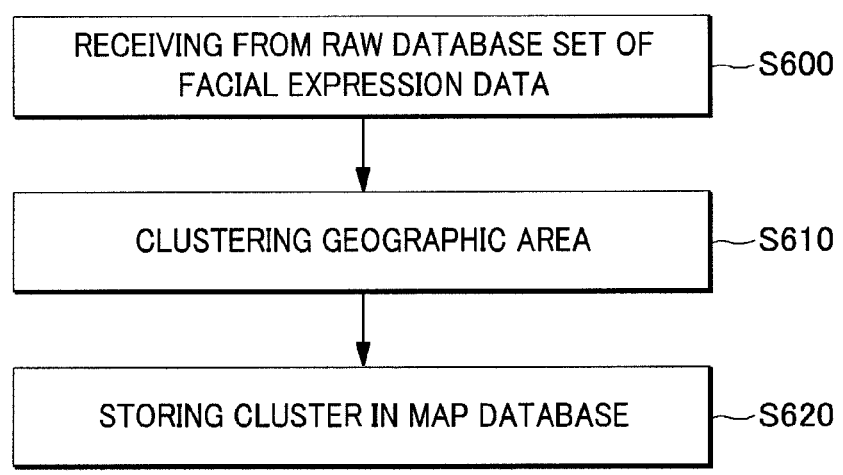
FIG. 6 shows an example flow diagram of a process of a computing device for a gaming scheme using general mood information, arranged in accordance with at least some embodiments described herein.

FIG. 6 shows an example flow diagram of a process of a computing device for providing a gaming scheme using general mood information, arranged in accordance with at least some embodiments described herein. The method in FIG. 6 may be implemented in or by computing device 330, which may include receiving unit 510, clustering unit 520 and storing unit 530 discussed above. An example process may include one or more operations, actions, or functions as illustrated by one or more blocks S600, S610 and/or S620. Although illustrated as discrete blocks, various blocks may be divided into additional blocks, combined into fewer blocks, or eliminated, depending on the desired implementation. Processing may begin at block 600.

At block S600 (Receiving from Raw Database Set of Facial Expression Data), computing device 330 may receive, from raw database 320, at least one set of facial expression data which is accompanied by time information and location information. The time information relates to a time when an image for acquiring facial expression data was captured by camera 210, and the location information relates to a location where the image was captured. In at least some embodiments, the image was captured by camera 210. Processing may continue from block S600 to block S610.

At block S610 (Clustering Geographic Area), computing device 330 may cluster a geographic area to form at least one cluster based at least in part on the at least one set of facial expression data. In some embodiments, computing device 330 may spatiotemporally cluster the at least one set of facial expression data having time, place, and facial expression received from raw database 320, and the clustering may be performed to allocate trending facial expression data corresponding to a particular time and a particular geographical region. Each cluster may contain general mood information. The general mood information may include delight, anger, sorrow, joy, shock, fear, abomination and neutral or indifferent states. Processing may continue from block S610 to block S620.

At block S620 (Storing Cluster in Map Database), computing device 330 may store at least one cluster in map database 340 corresponding to the area. That is, cluster information may be stored in map database 340 corresponding to the area and town general mood information based on facial expressions in a particular area at a particular time may be attached to a simple geographic map. Thus, game providers can use such a map for their games.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
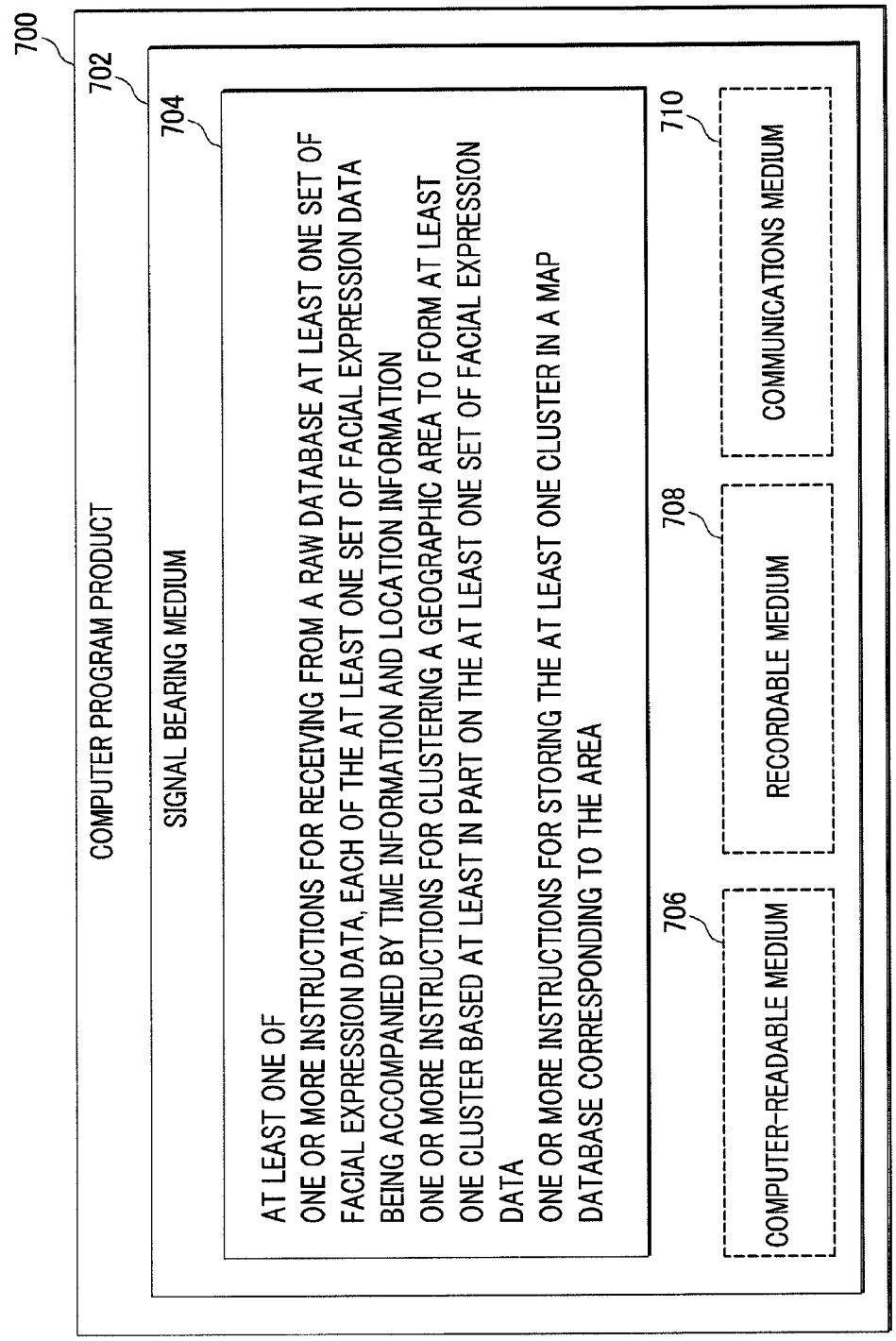
FIG. 7 illustrates a computer program product that may be utilized to provide a gaming scheme using general mood information, arranged in accordance with at least some embodiments described herein.

FIG. 7 illustrates a computer program product 700 that may be utilized to provide a gaming scheme using general mood information, in accordance with at least some embodiments described herein. A program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for receiving from a raw database at least one set of facial expression data, each of the at least one set of facial expression data being accompanied by time information and location information; clustering a geographic area to form at least one cluster based at least in part on the at least one set of facial expression data; and storing the at least one cluster in a map database corresponding to the area. Thus, for example, referring to FIG. 5, computing device 330 may undertake one or more of the blocks shown in FIG. 6 in response to instructions 704.

In some implementations, signal bearing medium 702 may encompass a computer-readable medium 706, including, but not limited to, a hard disk drive, a CD, a DVD, a digital tape, memory, etc. In some implementations, signal bearing medium 702 may encompass a recordable medium 708, including, but not limited to, memory, read/write (R/W) CDs, R/W DVDs, etc. In some implementations, signal bearing medium 702 may encompass a communications medium 710, including, but not limited to, a digital and/or an analog communication medium (e.g., a fiber optic cable, a waveguide, a wired communications link, a wireless communication link, etc.). Thus, for example, computer program product 700 may be conveyed to one or more modules of server 105 by an RF signal bearing medium 702, where the signal bearing medium 702 is conveyed by a wireless communications medium 710 (e.g., a wireless communications medium conforming with the IEEE 702.11 standard).

Figure 8:
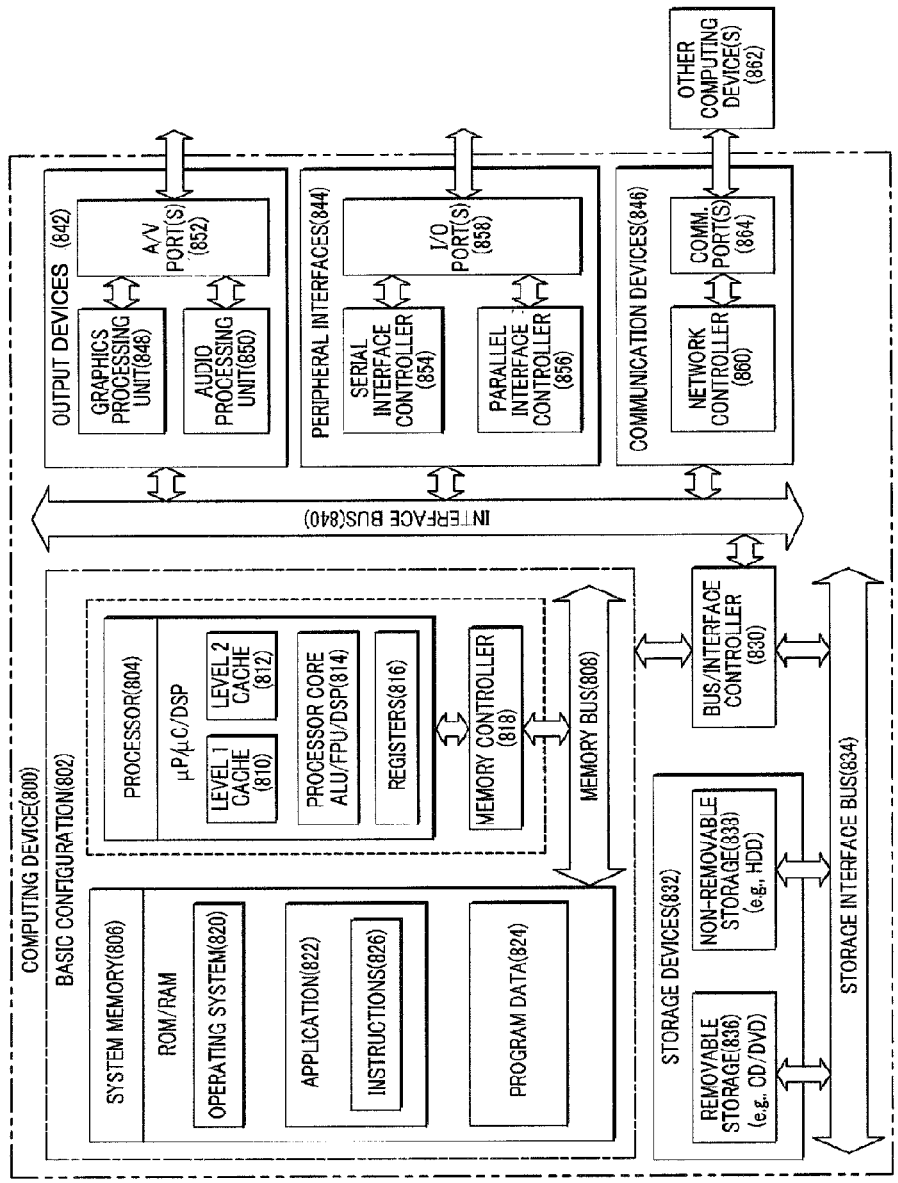
FIG. 8 is a block diagram illustrating an example computing device that may be utilized to provide a gaming scheme using general mood information, arranged in accordance with at least some embodiments described herein.

FIG. 8 is a block diagram illustrating an example computing device that may be utilized to provide a gaming scheme using general mood information, in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include instructions 826 that may be arranged to perform the functions as described herein including the actions described with respect to the computing device 330 architecture as shown in FIG. 5 or including the actions described with respect to the flow charts shown in FIG. 6. In some examples, application 822 may be arranged to operate with program data 824 on an operating system 820 such that implementations for instructions for an electronic device as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a computing device, comprising:
    receiving from a raw database at least one set of facial expression data and at least one external factor including at least one of population density, weather conditions and event information, each of the at least one set of facial expression data being accompanied by time information and location information and being obtained from at least one image, the at least one image being captured by a camera installed at a fixed geographic area;
    clustering the geographic area to form at least one cluster corresponding to general mood information determined based at least in part on the at least one set of facial expression data obtained from the at least one image captured by the camera installed at the fixed geographic area;
    storing the at least one cluster and the at least one external factor in a map database corresponding to the geographic area;
    obtaining a correlation between the at least one cluster and the at least one external factor; and
    based on the obtained correlation, attaching information of how the general mood information changes according to the at least one external factor to the map database.

2. The method of claim 1, wherein the at least one image is captured by the camera at a time corresponding to the time information and at a location corresponding to the location information.

3. The method of claim 1, wherein the at least one image is captured by the camera for a predetermined period corresponding to the time information and at a location corresponding to the location information.

4. The method of claim 1, wherein the general mood information is one that reveals an emotion.

5. The method of claim 1, wherein the clustering includes a spatiotemporal clustering, and each of the at least one cluster includes temporal information and spatial information within the geographic area.

6. The method of claim 5, wherein the storing includes attaching each of the at least one cluster to the map database based at least in part on the temporal information and the spatial information.

7. The method of claim 6, further comprising:
    determining a time and a location at which an actual position-based game is played; and
    based on the determined time and location, determining the general mood information for the actual position-based game from the map database.

8. The method of claim 1, wherein at least one of the raw database and the map database is stored in a cloud data center.

9. A method performed under control of a computing device, comprising:
- receiving at least one image captured by at least one camera installed in a fixed geographic area;
- obtaining at least one set of facial expression data from the at least one captured image, each of the at least one set of facial expression data being accompanied by time information and location information;
- receiving at least one external factor including at least one of population density, weather conditions and event information;
- clustering the geographic area to form at least one cluster corresponding to general mood information determined based at least in part on the at least one set of facial expression data obtained from the at least one captured image by the at least one camera installed in the fixed geographic area;
- storing the at least one cluster and the at least one external factor in a map database corresponding to the geographic area;
- obtaining a correlation between the at least one cluster and the at least one external factor; and
- based on the obtained correlation, attaching information of how the general mood information changes according to the at least one external factor to the map database.

10. The method of claim 9, wherein the general mood information is one that reveals an emotion.

11. The method of claim 9, wherein the clustering includes a spatiotemporal clustering, and each of the at least one cluster includes temporal information and spatial information within the geographic area.

12. The method of claim 11, wherein the storing includes attaching each of the at least one cluster to the map database based at least in part on the temporal information and the spatial information.

13. A computing device, comprising:
- a receiving unit configured to receive from a raw database at least one set of facial expression data and at least one external factor including at least one of population density, weather conditions and event information, each of the at least one set of facial expression data being accompanied by time information and location information, wherein the each of the at least one set of facial expression data is obtained from at least one image captured by a camera installed at a fixed geographic area;
- a clustering unit configured to perform a spatiotemporal clustering of the geographic area to form at least one cluster corresponding to general mood information determined based at least in part on the at least one set of facial expression data obtained from the at least one image captured by the camera installed in the fixed geographic area; and
- a storing unit configured to:
  - store the at least one cluster and the at least one external factor in a map database corresponding to the geographic area;
  - obtain a correlation between the at least one cluster and the at least one external factor; and
  - based on the obtained correlation, attach information of how the general mood information changes according to the at least one external factor to the map database.

14. The computing device of claim 13, wherein the at least one image is captured by the camera at a time corresponding to the time information and at a location corresponding to the location information.

15. The computing device of claim 13, wherein the general mood information is one that reveals an emotion.

16. The computing device of claim 13, wherein each of the at least one cluster includes temporal information and spatial information within the geographic area, and
- wherein the storing unit is further configured to attach each of the at least one cluster to the map database based at least in part on the temporal information and the spatial information.

17. The computing device of claim 13, wherein each of the at least one external factor relates to one of the at least one set of facial expression data.

18. The computing device of claim 13, wherein at least one of the raw database and the map database is stored in a cloud data center.

* * * * *